United States Patent
Murnan et al.

(10) Patent No.: US 9,994,321 B2
(45) Date of Patent: Jun. 12, 2018

(54) RECLINING PASSENGER SEAT

(71) Applicant: Zodiac Seats US LLC, Gainesville, TX (US)

(72) Inventors: Justin K. Murnan, Whitesboro, TX (US); Ty Parker, Sanger, TX (US); Marc W. Kinard, Corinth, TX (US); Josh T. Smith, Denton, TX (US); Andreas Bucher, Brackley Northants (GB); John D. Allen, Sanger, TX (US); Raul G. Reyes, Denton, TX (US); Hollie C. Driscoll, Gainesville, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days. days.

(21) Appl. No.: 15/127,436

(22) PCT Filed: Apr. 2, 2015

(86) PCT No.: PCT/US2015/024004
§ 371 (c)(1),
(2) Date: Sep. 20, 2016

(87) PCT Pub. No.: WO2015/153840
PCT Pub. Date: Oct. 8, 2015

(65) Prior Publication Data
US 2017/0174345 A1    Jun. 22, 2017

Related U.S. Application Data

(60) Provisional application No. 61/974,506, filed on Apr. 3, 2014.

(51) Int. Cl.
*B60N 2/12* (2006.01)
*B64D 11/06* (2006.01)

(52) U.S. Cl.
CPC ........ *B64D 11/064* (2014.12); *B64D 11/0643* (2014.12); *B64D 11/0646* (2014.12)

(58) Field of Classification Search
CPC .............. B64D 11/064; B64D 11/0643; B64D 11/0646
(Continued)

(56) References Cited

U.S. PATENT DOCUMENTS 3,572,829 A * 3/1971 Malitte .................. B64D 11/06
297/317
5,058,954 A * 10/1991 Kan-Chee .............. B60N 2/242
297/317 X
(Continued)

FOREIGN PATENT DOCUMENTS

| EP | 1057725 | 12/2000 |
|----|---------|---------|
| WO | 2008107689 | 9/2008 |
| WO | 2015153840 | 10/2015 |

OTHER PUBLICATIONS

International Patent Application No. PCT/US2015/024004, Search Report and Written Opinion dated Jul. 16, 2015.

*Primary Examiner* — Rodney B White
(74) *Attorney, Agent, or Firm* — Kilpatrick Townsend & Stockton LLP; Dean W. Russell; Davidson G. Lucas

(57) ABSTRACT

Described is a passenger seat that includes a seat back with a lower portion disposed adjacent to the seat bottom, and recline mechanism configured to move the passenger seat between an upright position and a reclined position. The recline mechanism may move the passenger seat in two directions. The recline mechanism may include a plurality of corresponding members configured to interface with a plurality of elongate motion members.

20 Claims, 4 Drawing Sheets

(58) Field of Classification Search
USPC .......... 297/322, 340, 341, 342, 337, 354.12, 297/361.1, 317
See application file for complete search history.

(56) References Cited

U.S. PATENT DOCUMENTS

| | | | | |
|---|---|---|---|---|
| 5,785,384 | A * | 7/1998 | Sagstuen | A47C 1/032 297/317 |
| 6,305,644 | B1 | 10/2001 | Beroth | |
| 6,334,648 | B1 * | 1/2002 | Girsberger | B60N 2/4221 297/322 X |
| 6,578,917 | B1 * | 6/2003 | Aubert | B60N 2/002 297/322 X |
| 6,641,214 | B2 * | 11/2003 | Veneruso | B60N 2/0232 297/322 X |
| 6,742,840 | B2 * | 6/2004 | Bentley | B60N 2/22 297/322 X |
| 7,472,957 | B2 * | 1/2009 | Ferry | B60N 2/206 297/340 X |
| 7,722,114 | B2 * | 5/2010 | Smith | A47C 1/0352 297/354.12 X |
| 8,403,415 | B2 * | 3/2013 | Lawson | B64D 11/06 297/322 X |
| 8,439,435 | B2 * | 5/2013 | Gaither | B60N 2/242 297/322 X |
| 8,733,840 | B2 * | 5/2014 | Westerink | B64D 11/06 297/322 X |
| 2001/0000639 | A1 | 5/2001 | Park et al. | |
| 2007/0262625 | A1 | 11/2007 | Dryburgh et al. | |
| 2011/0148167 | A1 * | 6/2011 | Westerink | B64D 11/06 297/354.12 |
| 2012/0038196 | A1 | 2/2012 | Lawson | |
| 2013/0009435 | A1 * | 1/2013 | Westerink | B60N 2/1625 297/313 |
| 2015/0284087 | A1 * | 10/2015 | Henshaw | B64D 11/064 297/342 X |

* cited by examiner

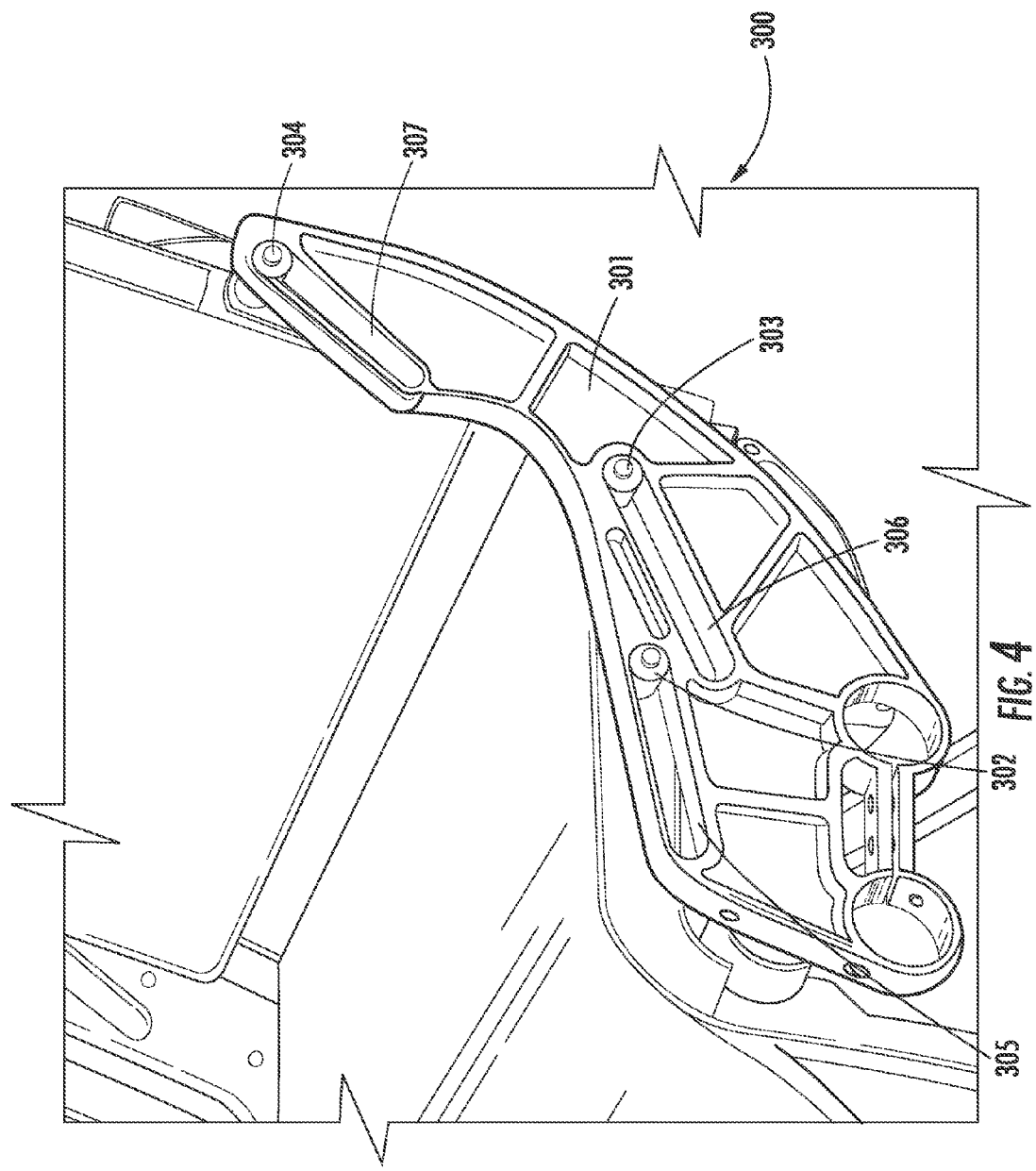

RECLINING PASSENGER SEAT

CROSS REFERENCE TO RELATED APPLICATIONS

This application is the U.S. national phase entry of International Patent Application Serial No. PCT/US2015/024004 ("the '004 application"), filed on Apr. 2, 2015, which application is related to and claims priority benefits from U.S. Provisional Application Ser. No. 61/974,506 ("the '506 application"), filed on Apr. 3, 2014, entitled AIRCRAFT SEAT MOTION THAT IMPROVES LIVING SPACE AND PASSENGER INGRESS AND EGRESS. The '004 and '506 applications are hereby incorporated in their entireties by this reference.

FIELD OF THE INVENTION

The field of the invention relates to reclining mechanisms and passenger seats for aircraft or the like.

BACKGROUND

Many passenger seats such as those on passenger aircraft, buses, trains, and the like include mechanisms related to passenger comfort and convenience. For example, seat structural assemblies are designed to pivot, recline, or otherwise move to provide an ergonomic interface for passengers. The design of conventional seats along with the design of the recline mechanism may include inefficiencies that lead to reduced space for passenger.

In certain situations, it may be desirable to design seats and related recline mechanisms to maximize passenger space. Efficient seat and recline mechanism design facilitates advantageous ergonomics and passenger comfort.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises: a seat bottom; a seat back with a lower portion disposed adjacent to the seat bottom; and a recline mechanism configured to move the passenger seat between an upright position and a reclined position, wherein the recline mechanism moves the passenger seat in two directions.

In some embodiments, the recline mechanism is configured to move both the seat bottom and the seat back.

In certain embodiments, the recline mechanism comprises: a spreader; and a plurality of elongate motion members. In some embodiments, the seat bottom and the seat back comprise a plurality of corresponding members configured to interface with the plurality of elongate motion members. In certain embodiments, the plurality of elongate motion members comprise slots and the plurality of corresponding members comprise rollers, where each roller is configured to slide through one of the slots.

The interface between the plurality of elongate motion members and the plurality of corresponding members, in some embodiments, comprises at least one of (a) rails and sliding fittings, (b) telescoping slides, (c) ball bearings, and (d) rack and pinion.

In some embodiments, when moving from the upright position to the reclined position, the two directions are downward and toward the front with respect to the passenger seat. In certain embodiments, when moving from the reclined position to the upright position, the two directions are upward and toward the rear with respect to the passenger seat.

In certain embodiments, when in the reclined position, at least a portion of the passenger seat is located further forward in comparison to the upright position.

The plurality of elongate motion members, in certain embodiments, each comprise a curved motion path.

According to certain embodiments of the present invention, a passenger seat comprises: a seat bottom; a seat back with a lower portion disposed adjacent to the seat bottom; and a recline mechanism configured to move the passenger seat between an upright position and a reclined position using a kinematic linkage with at least two non-parallel elongate motion paths.

The recline mechanism, in some embodiments, is configured to move both the seat bottom and the seat back.

The kinematic linkage, in certain embodiments, comprises: a spreader; and at least two elongate motion members that correspond to the at least two non-parallel elongate motion paths.

In some embodiments, the seat bottom and the seat back comprise a plurality of corresponding members configured to interface with the at least two elongate motion members.

The at least two elongate motion members, in some embodiments, comprise slots and the plurality of corresponding members comprise rollers, where each roller is configured to slide through one of the slots.

In certain embodiments, when moving from the reclined position to the upright position, the recline mechanism is configured to move the passenger seat downward and toward the front with respect to the passenger seat.

In some embodiments, when in the reclined position, at least a portion of the passenger seat is located further forward in comparison to the upright position.

According to certain embodiments of the present invention, a passenger seat comprises: a seat bottom; a seat back with a lower portion disposed adjacent to the seat bottom; and a recline mechanism configured to move the seat bottom and the seat back between an upright position and a reclined position using a kinematic linkage with at least two non-parallel elongate motion paths to move the passenger seat in two dimensions.

The kinematic linkage, in certain embodiments, comprises: a spreader; and at least two elongate motion members that correspond to the at least two non-parallel elongate motion paths.

In certain embodiments, when in the reclined position, at least a portion of the passenger seat is located further forward in comparison to the upright position.

BRIEF DESCRIPTION OF THE DRAWINGS

FIG. 4 is a perspective detail view of the passenger seats of FIG. 1.

DETAILED DESCRIPTION

Figure 1:
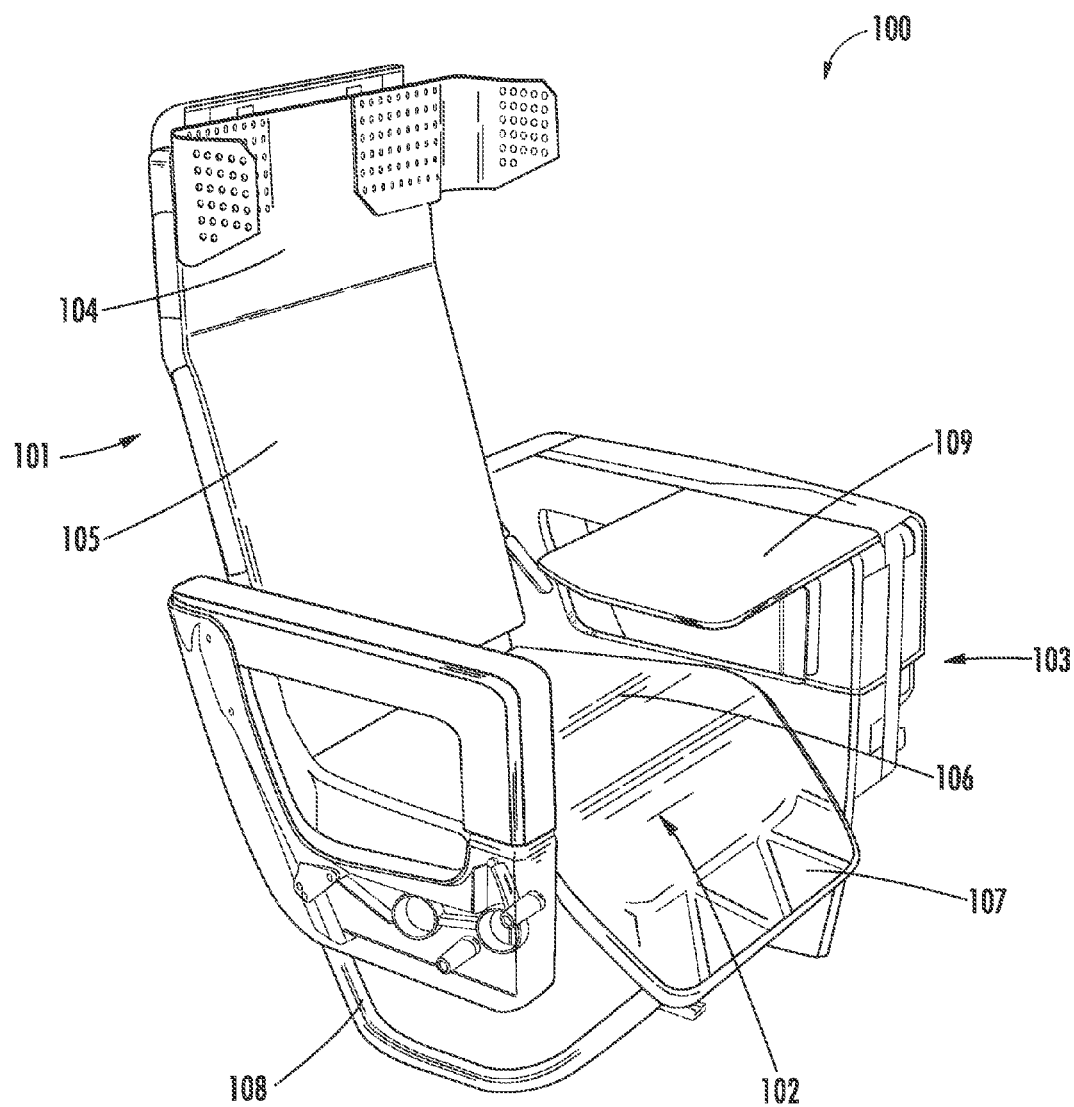
FIG. 1 is a perspective view of passenger seats according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-4 illustrate embodiments of a passenger seat 100. In these embodiments, the passenger seat 100 comprises a back rest 101, a seat bottom 102, an arm rest assembly 103, and a seat base 108. The seat bottom 102 may be attached to an upper portion of the seat base 108. The back rest 101 may include a headrest portion 104 and a lower portion 105. The seat bottom 102 may include a seat pan 106 and a leg extension 107. In some embodiments, each seat 100 is independent of all other seats 100. In some embodiments, multiple seats 100 are formed together as a single unit to reduce manufacturing costs.

As shown in FIG. 1, the passenger seat 100 may include one or more arm rest assemblies 103 secured on one or both sides of the seat bottom 102. In some embodiments, the arm rest assembly 103 includes a deployable tray table 109 (shown in the deployed position in FIG. 1). In some embodiments, the tray table 109 is configured to fold into a cavity in arm rest assembly 103. The seat base 108 is attached to the underside of the seat bottom 102.

Figure 2:
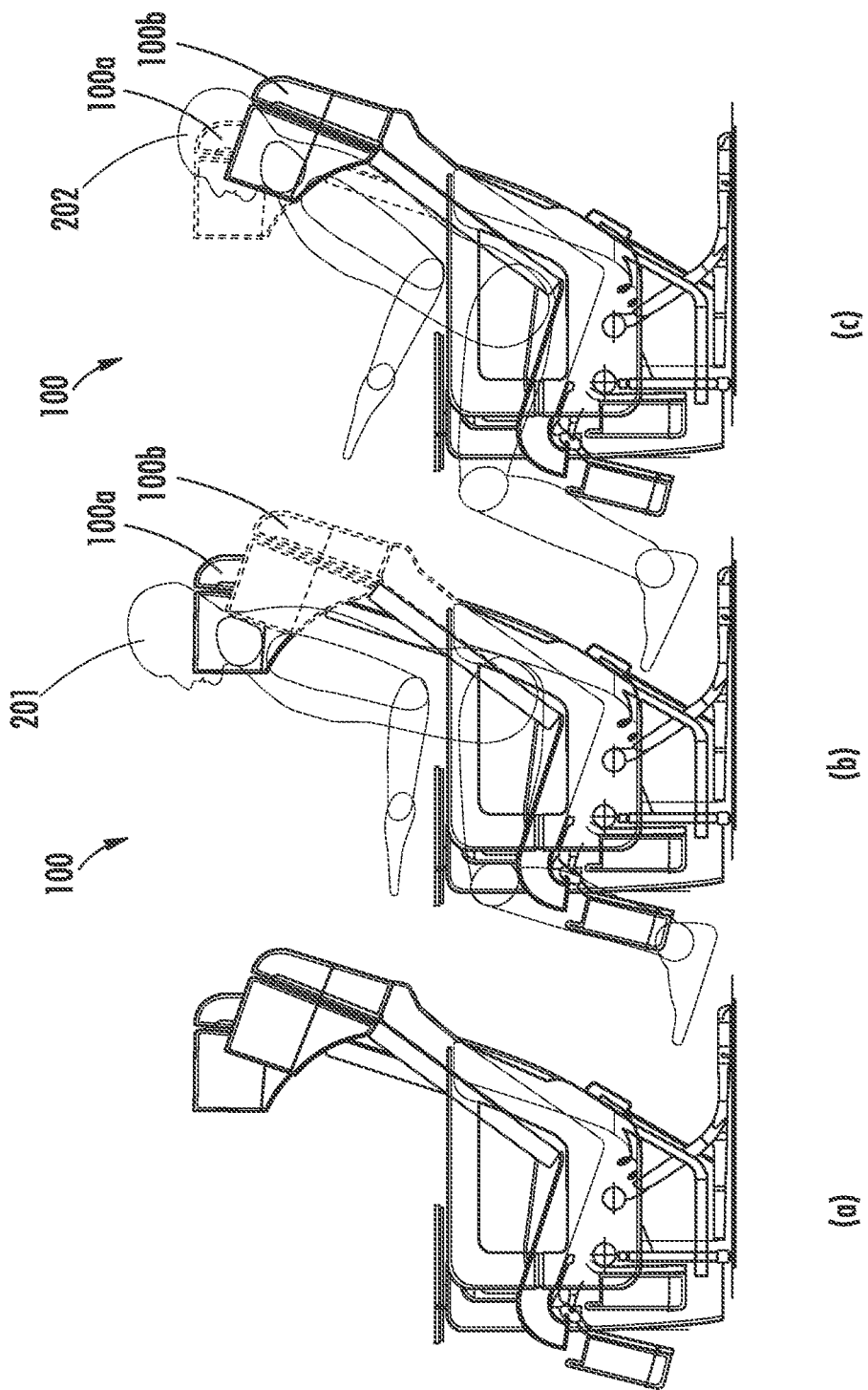
FIG. 2 is a side view of the passenger seats of FIG. 1.

As shown in FIG. 2, the passenger seat 100 may move between an upright position 100a and a reclined position 100b. FIG. 2 shows three rows of seats, (a), (b), and (c). The seat in row (b) shows an upright passenger 201 sitting in the seat 100 while in the upright position 100a. The seat in row (c) shows a reclined passenger 202 sitting in the seat 100 while in the reclined position 100b.

Figure 3:
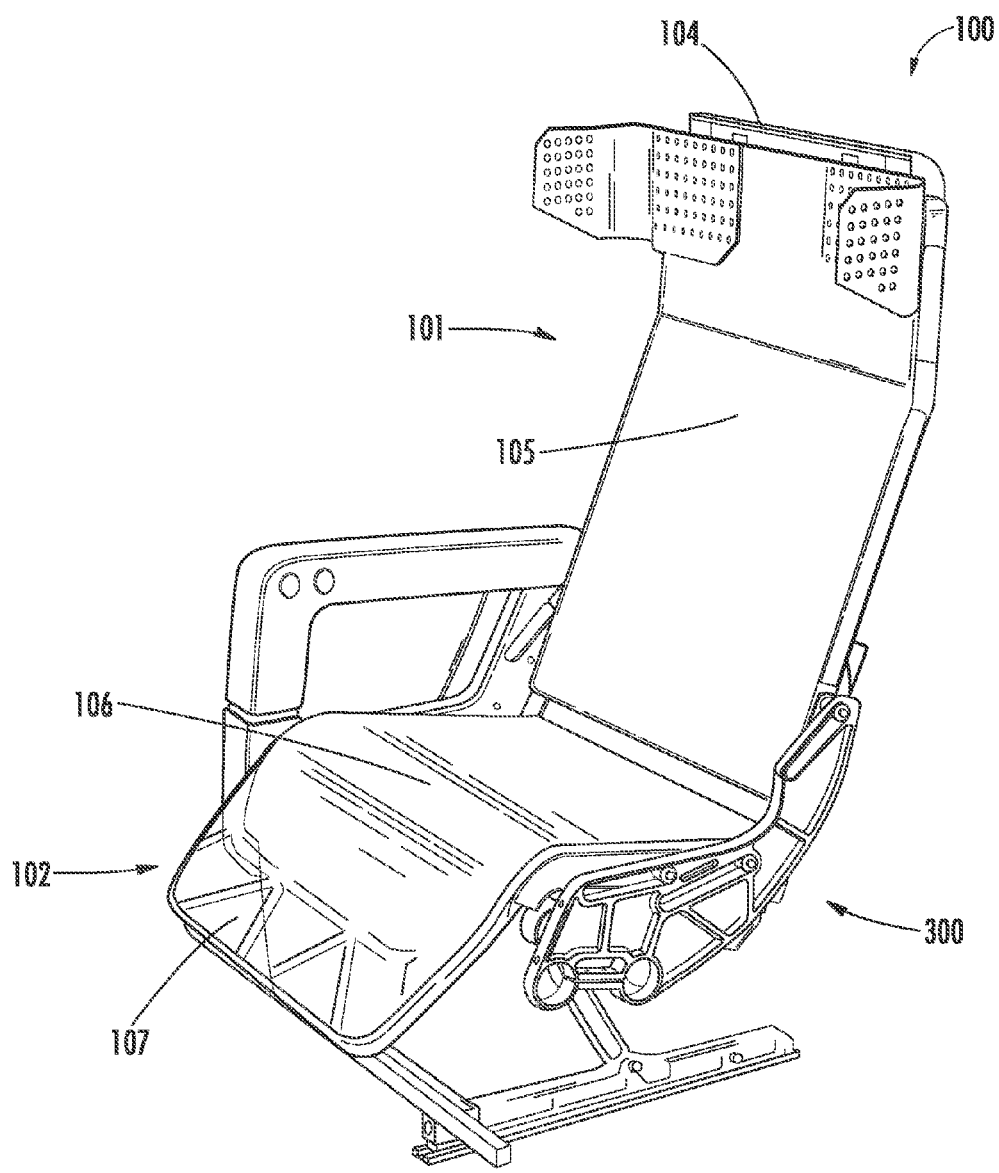
FIG. 3 is a partial perspective view of the passenger seats of FIG. 1.

The passenger seat 100 is shown in FIG. 3 with some parts removed to expose recline mechanism 300. In some embodiments, the recline mechanism 300 is attached to both the back rest 101 and the seat bottom 102. As shown in FIG. 4, the recline mechanism 300 may include an spreader 301. In some embodiments, the spreader 301 includes a plurality of elongate motion members 305, 306, 307. For example, as shown in FIG. 4, the spreader 301 may include three roller tracks: front roller track 305, middle roller track 306, and upper roller track 307. Although three elongate motion members are illustrated, any number may be utilized to provide acceptable motion for the passenger seat 100. The plurality of elongate motion members may each interface with a corresponding member attached to the back rest 101 and/or the seat bottom 102. For example, rollers or studs may be attached to the back rest 101 and the seat bottom 102. As shown in FIG. 4, a front roller 302 interfaces with and slides through the front roller track 305, a middle roller 303 slides within middle roller track 306, and an upper roller 304 slides along the upper roller track 307.

Although FIGS. 3 and 4 illustrate rollers traveling through slots, the recline mechanism 300 may utilize other objects such as, for example, rails and sliding fittings, telescoping slides, ball bearings, rack and pinion, or any other suitable object. Furthermore, although FIGS. 3 and 4 illustrate rollers traveling through linear slots, the recline mechanism 300 may utilize curved slots. In some embodiments, the recline mechanism 300 is configured to move the passenger seat 100 between an upright position 100a and a reclined position 100b using a kinematic linkage having at least two non-parallel elongate motion paths. For example, the three illustrated elongate motion members 305, 306, 307 are non-parallel to one another (i.e., represent three different directions).

The rollers 302, 303, 304 are illustrated in FIG. 4 (with respect to the passenger seat 100) in their rearmost position within their respective slot or track. In other words, in FIG. 4, front roller 302 is shown in the rearmost position within the front roller track 305, middle roller 303 is shown in the rearmost position within the middle roller track 306, and upper roller 304 is shown in the rearmost position within the upper roller track 307. These rearmost positions correspond to upright position 100a. For the passenger seat 100 to move from upright position 100a to reclined position 100b, the rollers 302, 303, 304 move from the rearmost position (as shown in FIG. 4), toward the front of their respective slot or track. In other words, to move the seat toward the reclined position 100b, front roller 302 moves toward the front of the front roller track 305, middle roller 303 moves toward the front of the middle roller track 306, and upper roller 304 moves toward the front of the upper roller track 307.

The movement of the three rollers (front roller 302, middle roller 303, and upper roller 304) from the rearmost position within their respective slots (as shown in FIG. 4) toward the front of their respective tracks (i.e., movement from the upright position 100a toward the reclined position 100b) may be simultaneous. However, in some embodiments, the rollers may move at different times and/or velocity/speed from one another. The timing and velocity of the movement of the rollers may be determined by (1) the kinematic linkage between the rollers 302, 303, 304, the back rest 101, and the seat bottom 102; (2) the flexibility of to the back rest 101 and the seat bottom 102; (3) relative movement between the back rest 101 and the seat bottom 102; and/or a number of other factors.

To reach a reclined position, conventional seats often merely pivot about a single axis (i.e., allowing for movement in a one-dimension, "1-D" movement). However, such a design reduces space available for a passenger located behind the reclined seat. For example, as a seat tilts backward to recline (pivoting about an axis near the bottom of the seat back rest), the upper portion of the back rest moves toward a seat in a row behind the reclining seat. This reduction in space creates problems for passenger ingress and egress. In addition, a single axis pivot can prevent a passenger's feet from reaching the ground.

In contrast to some conventional seats with a single axis pivot, recline mechanism 300 facilitates two-dimensional ("2-D") movement with respect to the passenger seat 100. Because the rollers move (with respect to the seat 100) in both the (1) front/rear direction and the (2) up/down direction, the back rest 101 and the seat bottom 102 also move in both directions. This movement allows the passenger to recline the seat 100 while limiting the distance the back rest 101 moves rearward (thus limiting the reduction in space behind the seat). In other words, as the seat 100 moves toward the reclined position 100*b*, the back rest 101 and the seat bottom 102 move forward and down.

The two-dimensional movement of the back rest 101 and the seat bottom 102 both minimizes the reduction in passenger space behind the seat (improving ingress and egress) and allows the passenger to reach the ground with his or her feet.

The components of the passenger seat 100 may be formed of materials including, but not limited to, carbon composite, plastic, thermoplastic, steel, aluminum, stainless steel, other plastic or polymer materials, other metallic materials, other composite materials, or other similar materials. Moreover, the components of the passenger seat 100 may be attached to one another via suitable fasteners, which include, but are not limited to, screws, bolts, rivets or other mechanical or chemical fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
   a seat bottom;
   a seat back with a lower portion disposed adjacent to the seat bottom; and
   a recline mechanism comprising at least one spreader, wherein the recline mechanism is configured to move the passenger seat between an upright position and a reclined position, wherein the recline mechanism moves the passenger seat in two directions, wherein:
   the at least one spreader comprises a plurality of elongate motion members;
   each of the plurality of elongate motion members move at different times from one another such that the seat bottom and the seat back move at different times from one another; and
   the plurality of elongate motion members comprises three linear nonparallel slots.

2. The passenger seat of claim 1, wherein each of the plurality of elongate motion members comprises a forward end and a rear end, wherein the forward end is closer to a bottom of the passenger seat compared to the rear end for each of the three linear nonparallel slots.

3. The passenger seat of claim 2, wherein the three linear nonparallel slots comprise a front roller track, a middle roller track, and an upper roller track, and wherein a slope between the forward end and the rear end of the upper roller track is steeper than slopes of the front roller track and the middle roller track.

4. The passenger seat of claim 3, wherein a slope between the forward end and the rear end of the front roller track is less steep than slopes of the upper roller track and the middle roller track such that the front roller track is closer to horizontal than the upper roller track and the middle roller track.

5. The passenger seat of claim 1, wherein:
   the seat bottom and the seat back comprise a plurality of corresponding members that interface with the plurality of elongate motion members; and
   each of the plurality of corresponding members comprises a roller that is configured to slide through one of the elongate motion members.

6. The passenger seat of claim 1, wherein, when moving from the upright position to the reclined position, the two directions are downward and toward a forward side of the passenger seat.

7. The passenger seat of claim 1, wherein, when moving from the reclined position to the upright position, the two directions are upward and toward a rear side of the passenger seat.

8. The passenger seat of claim 1, wherein, when in the reclined position, at least a portion of the passenger seat is located further forward in comparison to the upright position.

9. A passenger seat comprising:
   a seat bottom;
   a seat back with a lower portion disposed adjacent to the seat bottom; and
   a recline mechanism comprising at least one spreader, wherein the recline mechanism is configured to move the passenger seat between an upright position and a reclined position, wherein:
   the at least one spreader comprises a plurality of elongate motion members;
   each of the plurality of elongate motion members move at different times from one another such that the seat bottom and the seat back move at different times and speeds from one another; and
   the plurality of elongate motion members comprises three linear nonparallel slots.

10. The passenger seat of claim 9, wherein:
    each of the plurality of elongate motion members comprises a forward end and a rear end, wherein the forward end is closer to a bottom of the passenger seat compared to the rear end for each of the three linear nonparallel slots.

11. The passenger seat of claim 10, wherein the three linear nonparallel slots comprise a front roller track, a middle roller track, and an upper roller track, and wherein a slope between the forward end and the rear end of the upper roller track is steeper than slopes of the front roller track and the middle roller track.

12. The passenger seat of claim 11, wherein the seat bottom and the seat back comprise a plurality of corresponding members that interface with the plurality of elongate motion members and each of the plurality of corresponding members comprises a roller that is configured to slide through one of the elongate motion members.

13. The passenger seat of claim 9, wherein, when moving from the reclined position to the upright position, the recline mechanism is configured to move the passenger seat downward and toward a forward side of the passenger seat.

14. The passenger seat of claim 9, wherein, when in the reclined position, at least a portion of the passenger seat is located further forward in comparison to the upright position.

15. A passenger seat comprising:
    a seat bottom;
    a seat back with a lower portion disposed adjacent to the seat bottom; and
    a recline mechanism comprising at least one spreader and three elongate motion members, wherein the recline mechanism is configured to move the seat bottom and the seat back between an upright position and a reclined position using a kinematic linkage with three linear non-parallel elongate motion paths to move the passenger seat in two dimensions, wherein each of the three elongate motion members comprises a linear slot including a forward end and a rear end, wherein the forward end is closer to a bottom of the passenger seat compared to the rear end for each of the linear slots.

16. The passenger seat of claim 15, wherein the three elongate motion members comprise a front roller track, a middle roller track, and an upper roller track, and wherein a slope between the forward end and the rear end of the upper roller track is steeper than slopes of the front roller track and the middle roller track.

17. The passenger seat of claim 15, wherein, when in the reclined position, at least a portion of the passenger seat is located further forward in comparison to the upright position.

18. A passenger seat comprising:

a seat bottom;

a seat back with a lower portion disposed adjacent to the seat bottom; and a recline mechanism comprising at least one spreader, wherein the recline mechanism is configured to move the passenger seat between an upright position and a reclined position, wherein the recline mechanism moves the passenger seat in two directions, wherein:

the at least one spreader comprises a plurality of elongate motion members;

each of the plurality of elongate motion members move at different times from one another such that the seat bottom and the seat back move at different times from one another; and each of the plurality of elongate motion members comprises a linear slot including a forward end and a rear end, wherein the forward end is closer to a bottom of the passenger seat compared to the rear end for each of the linear slots.

19. A passenger seat comprising:

a seat bottom;

a seat back with a lower portion disposed adjacent to the seat bottom; and a recline mechanism comprising at least one spreader, wherein the recline mechanism is configured to move the passenger seat between an upright position and a reclined position, wherein the recline mechanism moves the passenger seat in two directions, wherein:

the at least one spreader comprises a plurality of elongate motion members;

each of the plurality of elongate motion members move at different times from one another such that the seat bottom and the seat back move at different times from one another;

the seat bottom and the seat back comprise a plurality of corresponding members that interface with the plurality of elongate motion members; and each of the plurality of corresponding members comprises a roller that is configured to slide through one of the elongate motion members.

20. The passenger seat of claim 19, wherein the plurality of elongate motion members each comprise a curved motion path.

* * * * *